(12) United States Patent
Hahn et al.

(10) Patent No.: US 9,360,861 B2
(45) Date of Patent: Jun. 7, 2016

(54) DEVICE AND METHOD FOR SIMULATING A SEQUENCE FOR MACHINING A WORKPIECE ON A MACHINE TOOL

(75) Inventors: Rudolf Hahn, Schwangau (DE); Manfred Herz, Wildpoldsried (DE)

(73) Assignee: DMG Electronics GMBH, Pfronten (DE)

( * ) Notice: Subject to any disclaimer, the term of this patent is extended or adjusted under 35 U.S.C. 154(b) by 411 days.

(21) Appl. No.: 11/896,894

(22) Filed: Sep. 6, 2007

(65) Prior Publication Data
US 2008/0091394 A1 Apr. 17, 2008

(30) Foreign Application Priority Data
Sep. 15, 2006 (DE) .................. 10 2006 043 390

(51) Int. Cl.
*G06G 7/48* (2006.01)
*G05B 19/4069* (2006.01)

(52) U.S. Cl.
CPC .. *G05B 19/4069* (2013.01); *G05B 2219/13174* (2013.01); *G05B 2219/35309* (2013.01)

(58) Field of Classification Search
CPC .. G06F 17/50; G06F 17/5009; G06F 17/5086
USPC ................ 703/7, 17, 20; 72/13.5; 144/421; 714/51; 266/96
See application file for complete search history.

(56) References Cited

U.S. PATENT DOCUMENTS

| | | | |
|---|---|---|---|
| 5,148,363 A | 9/1992 | Sakamoto et al. | |
| 5,493,502 A * | 2/1996 | Niwa | G06N 7/04 318/571 |
| 5,613,115 A * | 3/1997 | Gihl | G05B 19/056 700/17 |
| 5,793,635 A * | 8/1998 | Niwa | G05B 19/406 318/570 |
| 6,341,996 B1 * | 1/2002 | Brien et al. | 451/8 |
| 6,356,800 B1 * | 3/2002 | Monz et al. | 700/184 |
| 6,438,446 B1 * | 8/2002 | Trachier | G05B 19/416 408/11 |
| 6,539,268 B1 | 3/2003 | Wucherer et al. | |
| 6,594,541 B1 | 7/2003 | Wucherer et al. | |
| 6,704,875 B1 * | 3/2004 | Kinoshita | G05B 19/042 700/299 |

(Continued)

FOREIGN PATENT DOCUMENTS

| | | |
|---|---|---|
| DE | 102 48 991 A1 | 5/2004 |
| DE | 103 60 530 A1 | 3/2005 |

(Continued)

OTHER PUBLICATIONS

X. W. Xu, and S. T. Newman, "Making CNC machine tools more open, interoperable and intelligent, a review of the technologies", ELSEVIER 2005.*

(Continued)

*Primary Examiner* — Omar Fernandez Rivas
*Assistant Examiner* — Iftekhar Khan
(74) *Attorney, Agent, or Firm* — Oliff PLC

(57) ABSTRACT

The invention relates to a device and a method for simulating a sequence for machining a workpiece on a machine tool. The invention is characterized by a holistic simulation approach. Particularly, a PLC control means 723 and a PLC sequence simulation means 725 assist in simulating the PLC movement sequences of the machine tool. This enables a realistic simulation of a machine tool in all its substantial aspects, resulting in considerable advantages especially in the field of training and during the determination of machine utilization times.

11 Claims, 12 Drawing Sheets

(56) References Cited

U.S. PATENT DOCUMENTS

| | | | |
|---|---|---|---|
| 6,889,097 B2 | 5/2005 | Kiesel et al. | |
| 6,912,442 B2 | 6/2005 | Wucherer et al. | |
| 6,950,715 B2 | 9/2005 | Wucherer et al. | |
| 7,174,284 B2 | 2/2007 | Dolansky et al. | |
| 7,209,800 B2 | 4/2007 | Monz et al. | |
| 8,538,574 B2* | 9/2013 | Hahn ........................... | 700/159 |
| 2002/0133264 A1* | 9/2002 | Maiteh et al. ................. | 700/182 |
| 2005/0065746 A1 | 3/2005 | Dohle et al. | |
| 2005/0071121 A1* | 3/2005 | Kappel ................ | G01B 21/04 702/155 |
| 2005/0090929 A1* | 4/2005 | Dolansky et al. ............ | 700/169 |
| 2005/0171629 A1* | 8/2005 | Suh et al. ....................... | 700/159 |
| 2006/0064289 A1* | 3/2006 | Walacavage et al. ............. | 703/7 |
| 2007/0061037 A1* | 3/2007 | Grossmann ........ | G05B 19/4069 700/182 |
| 2008/0243299 A1* | 10/2008 | Johnson ............... | G05B 19/414 700/169 |

FOREIGN PATENT DOCUMENTS

| | | |
|---|---|---|
| DE | 103 41 325 B4 | 1/2006 |
| EP | 0389990 A2 | 10/1990 |
| EP | 0 902 343 B1 | 3/2005 |
| JP | H04-68406 A | 3/1992 |
| JP | H05-324043 A | 12/1993 |
| JP | H08-87316 A | 4/1996 |
| JP | H11-296214 A | 10/1999 |
| JP | A-2003-316405 | 11/2003 |
| WO | WO 01/52005 A1 | 7/2001 |

OTHER PUBLICATIONS

Jianguang Li, W. B. Lee, C. F. Cheung, "Development of a Virtual Training Workshop in Ultra-precision Machining", Int. J. Engng Ed, vol. 18, No. 5, 2002.*

Yingxue Yao, Jianguang Li, W. B. Lee, C. F. Cheung, and Zhenjun Yuan, "VMMC: a test-bed for machining", Elsevier Science 2002.*

Jens Bathelt, "How to Implement the Virtual Machine Concept Using xPC Target", 2003.*

S. H. Suh, NPL, "A framework for an intelligent CNC and data model", 2002.*

W. B. Lee, NPL, "Development of a Virtual Training Workshop in Ultra-precision Machining", 2002.*

DMG, NPL, "LifeCycle Services, DMG Powetools Innovative Software Solutions", Feb. 6, 2000.*

Meier H; Kreusch, K.: Virtuelle Maschinen für eine realistische Simulation. In: wt Werkstattstechnik 90 (200) H. 1/2, 2000, S. 19-21.

Bedienungsanleitung: SINUMERIK 840D/810D HMI Embedded, Ausgabe Mar. 2004, 6FC5298-6AC00-0AP3, Siemens AG, 2004, S.i-xviii, 1-19 bis 2-43 und 4-80, 4-81, 6-224 bis 6-228.

Pritschow, G.; Croon, N.: Wege Zur virtuellen Werkzeugmaschine. In: wt Werkstattstechnik 92 (2002) H.5, 2002, S. 194-199.

Beesten, H.: 3D-Simulation in der SPS-Software-Entwicklung-Fertige Programme für fictive Maschinen. In: IEE 49. Jahrgang Nov. 2004, 2004, S. 156-159.

Softwareprüfung und Prozesssimulation mit WinMOD-Maschinenbau: Virtuelle Maschine. In: WinMOD Report—05.23, Mewes-Partner GmbH, 2005, S. 1-2.

Baudisch, T.: Simulationsumgebung zur Auslegung der Bewegungsdynamik des mechatronischen Systems Werkzeugmaschine. In.: Forschungsberichte iwb Band 179, Institut für Werkzeugmaschinen und Betriebswissenschaften, München, 2003, S.i-iv, 74, 75.

Dec. 26, 2011 Office Action issued in Japanese Patent Application No. 2007-237230 (translation).

Feb. 5, 2009 Extended European Search Report issued in European Patent Application No. 07017075.8.

Aug. 19, 2013 Appeal Decision issued in Japanese Patent Application No. 2007-237230.

Feb. 18, 2013 Preposing Procedure Report for Appeal issued in Japanese Patent Application No. 2007-237230.

Apr. 16, 2013 Office Action issued in Japanese Patent Application No. 2012-286200.

* cited by examiner

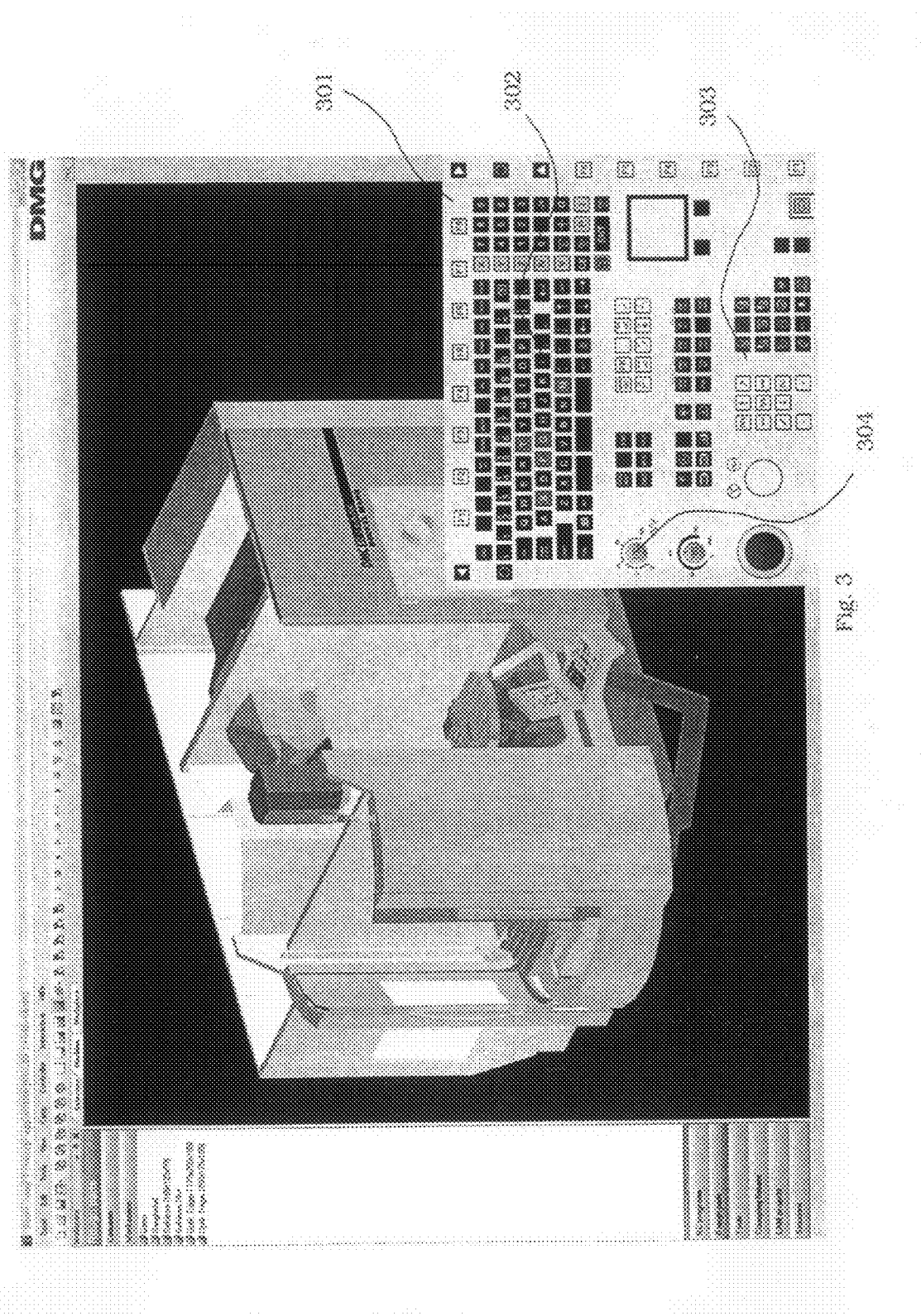

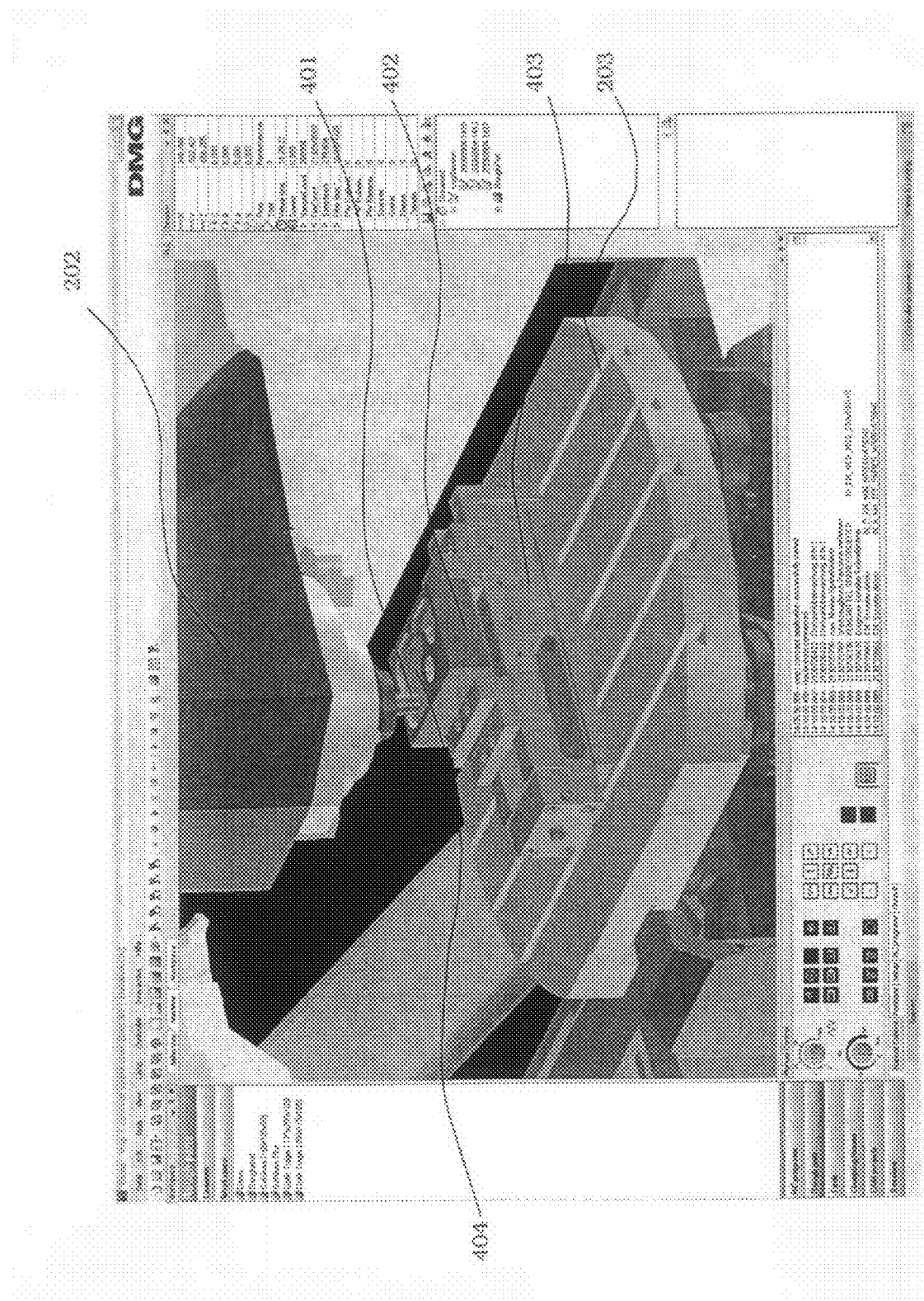

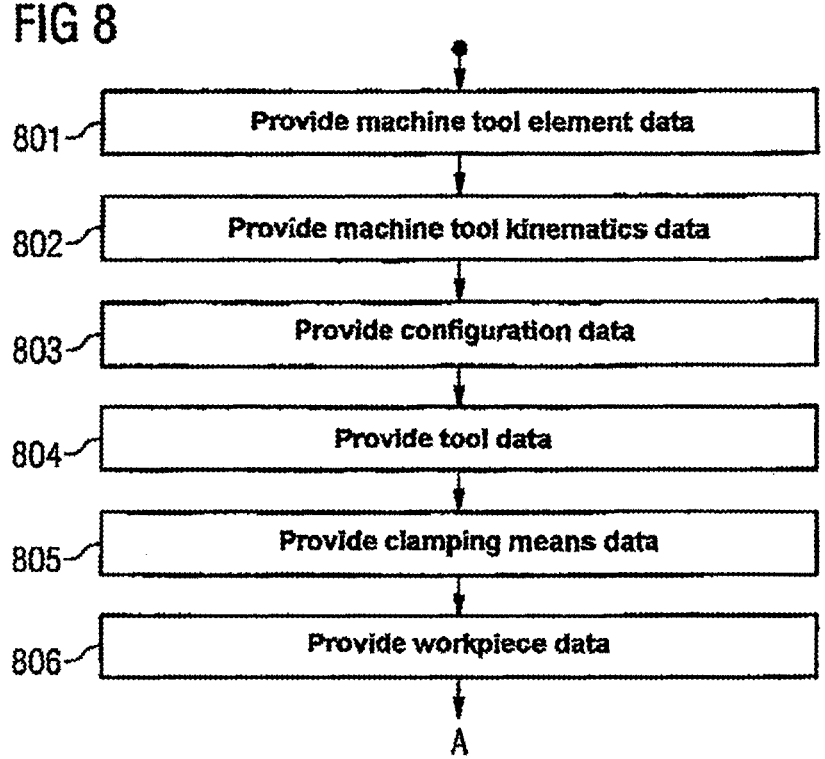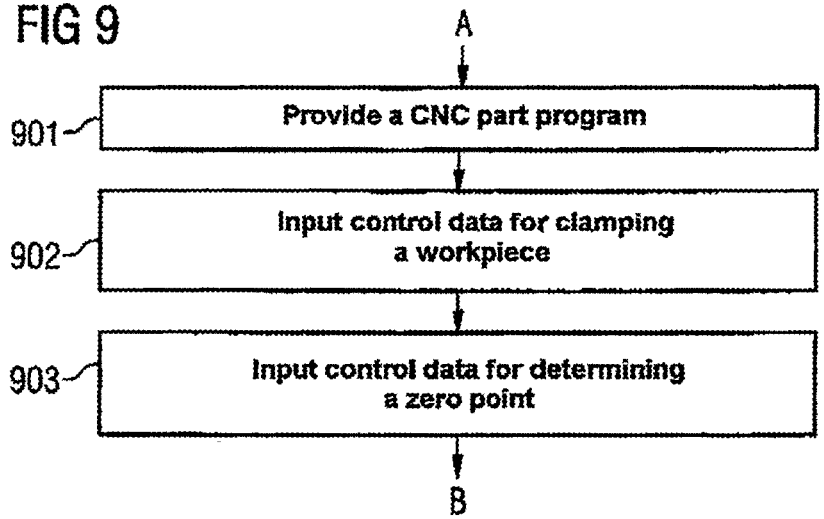

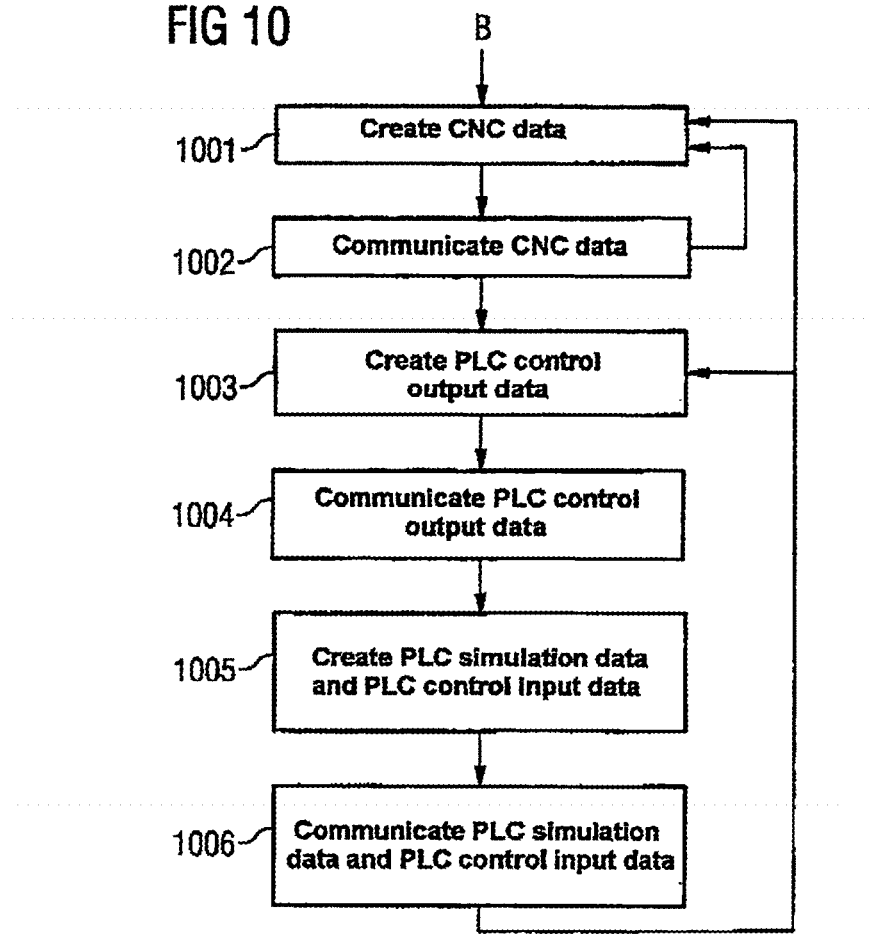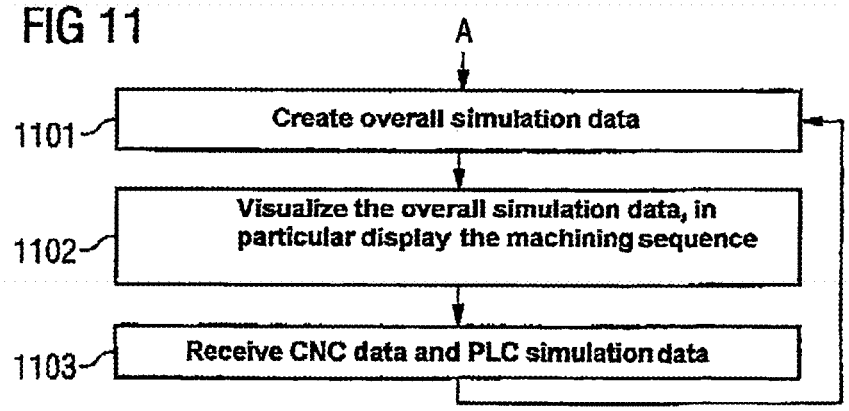

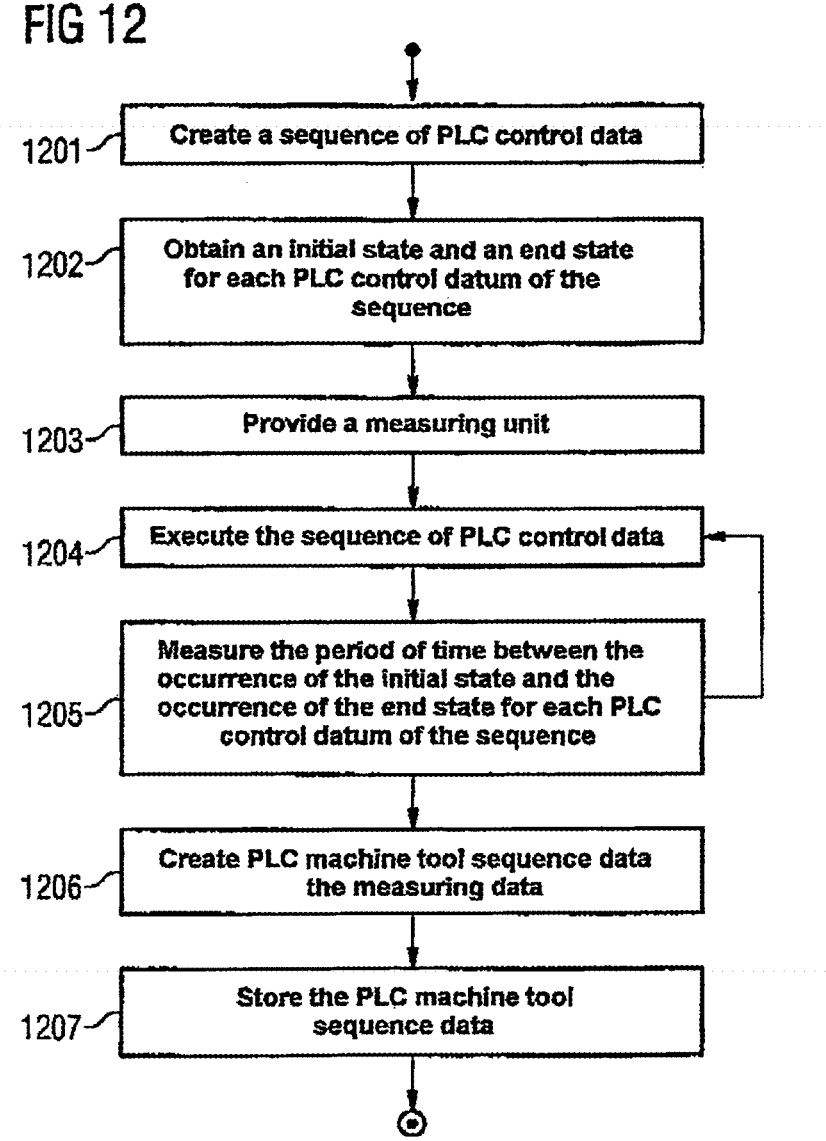

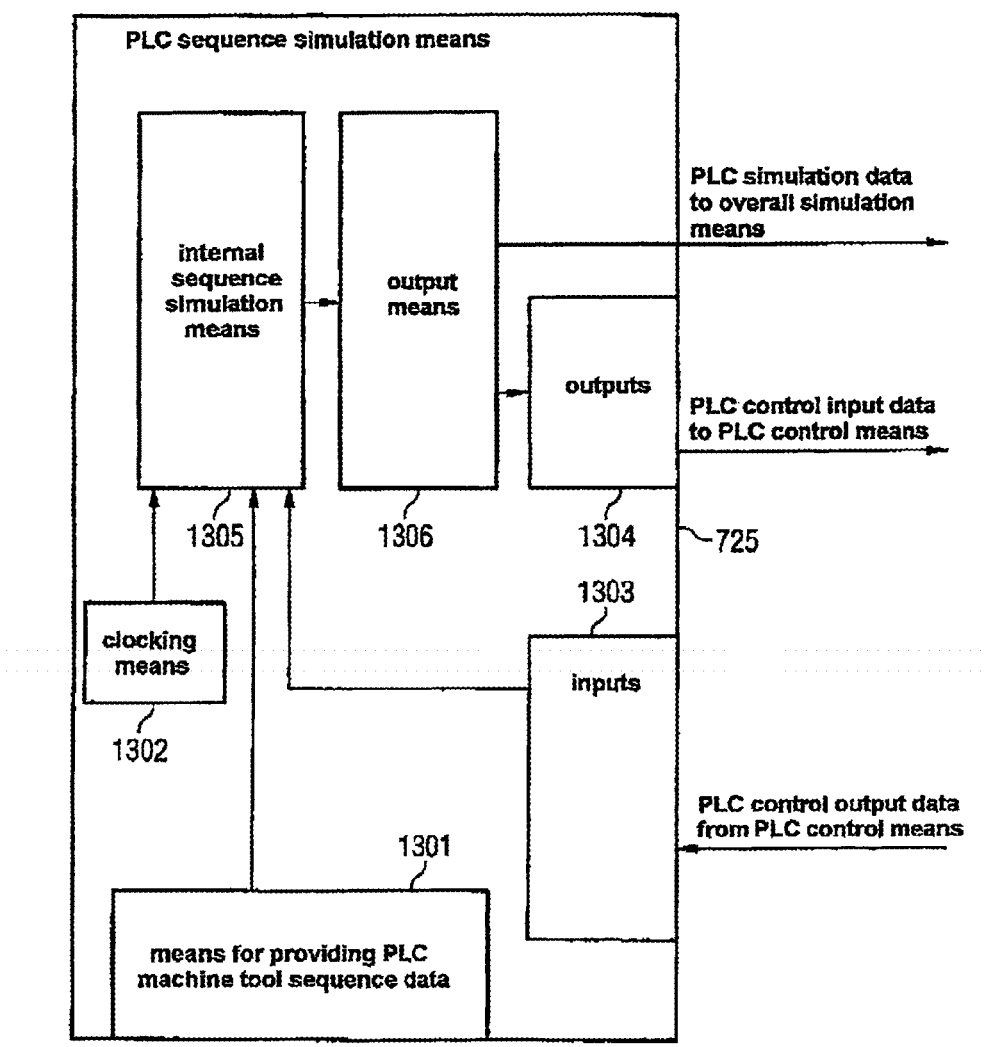

DEVICE AND METHOD FOR SIMULATING A SEQUENCE FOR MACHINING A WORKPIECE ON A MACHINE TOOL

The present invention relates to a device and method for simulating a sequence for machining a workpiece on a machine tool. Particularly, it is made possible to simulate sequences on CNC (computerized numerical control) machines.

The term CNC refers to a numerical control comprising one or a plurality of microprocessors for executing the control functions. The outer characteristics of a CNC are a display screen and a keyboard. The numerical control (CNC) is operated by a CNC program which comprises all necessary functions, such as interpolation, attitude control and speed control. Using the one or the plurality of microprocessors and the CNC program, a CNC part program depending on the workpiece is carried out which normally will be specified by the user of the machine.

A CNC part program consists of any number of sentences describing step by step the overall working sequence of the machine for machining a workpiece. Each sentence in the program represents a geometric machining step and/or a specific machine function. A sentence may contain different instructions. Distinctions are made between:
  Geometrical instructions by which the relative movements between the tool and the workpiece are controlled,
  Technological instructions by which feed rate, spindle speed and tools are determined,
  Traveling instructions determining the kind of movement, for example rapid movement, straight-line interpolation, circular interpolation and level selection,
  Switching commands for selecting the tools, indexing table positions, coolant supply,
  Correction calls, for example for a tool length correction, milling cutter diameter correction, cutting edge radius correction and zero point offset, as well as
  Cycle or sub-program calls for frequently recurring program sections.

Apart from the numerical control, the CNC program and the CNC part program, a logic control program (PLC program) to the machine to be controlled is additionally needed which will be created and integrated into a stored-program logic control ((SPS=PLC (programmable logic controller)) by the manufacturer of the machine. Therein, all machine-oriented linkages and interlocks for specific functional sequences are determined, such as for tool changes, workpiece changes and the axle limitations.

It is intended to emphasize some differences for a her limitation between CNC and PLC. A CNC part program for machining the workpieces is created by the machine user. CNC part programs may be changed or modified at random by the user. A PLC program, however, is created by the machine manufacturer and captively stored, for example on a ROM (read only memory). The PLC program needs to be altered or changed only in exceptional cases. Particularly, no programming during operation is performed in the PLC. PLC programs have to be created for each PLC (stored-program logic controller) and cannot be compiled for other PLC brands. The result based on this vital difference is that there may be up to several thousand CNC part programs per machine. The CNC part programs are created by the machine user, fixed cycles and subprograms may by all means be provided by the manufacturer. Usually, there is only one fixed, site-oriented program to one PLC. The program is created by the manufacturer of the machine, mostly by using available operating units.

Simulation systems for simulating the removal on a workpiece by a machine tool are known from the prior art. In such process, the workpiece and the removal performed thereon by the machine tool, for example, are visualized three-dimensionally. The visualized workpiece can be viewed from different angles.

On this basis systems are known which enable the user in graphical surroundings that visualize the workpiece and parts of the machine tool to specify machine sequences which may be tested on the virtual model in the system and are subsequently translated into a CNC part program.

An example of the prior art as described above is disclosed in EP 0 902 343. The system described therein allows the creation of a CNC part program for a virtual workpiece by using at least one virtual operating unit. In this system the user may specify virtual actions using a data input means. The predetermined virtual actions on the virtual operating units are automatically converted into control instructions of the control program that allow collision-free actions, taking into consideration a predetermined machine and control configuration. In this system the user does not have to know the machine and controller configuration. The complexity comprised in the machine and controller configuration is shifted from the user to the data processing means such that the user is enabled to solely concentrate on the virtual actions and virtual operating units to be simulated.

Starting from the prior art, it is the object of the invention to provide a device and method for simulating sequences on machine tools, which enable an enhanced simulation of movement sequences on machine tools.

According to the present invention, the object is achieved by a device comprising the features of claim 1, by a method comprising the features of claim 5 and a computer program product comprising the features of claim 9. Furthermore, the invention comprises a method for creating PLC machine tool sequence data including the features of claim 10 and a PLC sequence simulation means including the features of claim 11, which may be designed as a computer program product comprising the features of claim 12 in order to assist in achieving the above object.

Advantageous developments and preferred embodiments of the invention are stated in the sub-claims.

The invention describes a device for simulating a sequence for machining a workpiece on a machine tool. According to the invention, this device comprises a first storage means for storing machine tool data for creating a virtual image of a machine tool, a second storage means for storing workpiece data for creating a virtual image of at least one workpiece, and a third storage means for storing resource data for creating a virtual image of at least one resource.

Due to these means the data required for the creation of a realistic image of the machine tool are provided. This does not only include an illustration of the tool table and the workpiece but also the possibility of representing the clamping situation in detail during simulation. Furthermore, it is made possible to show the machine tool in various configurations, e.g., including the protective cab, i.e. as an external view or in a close view for exclusively displaying the tool table together with the workpiece and the tool. The corresponding data are supplied to the overall simulation apparatus by the corresponding means. Thus, a machine tool loaded with workpiece and tool is virtually provided.

A representation of a machining process of a workpiece on a machine tool which is particularly close to reality is realized according to the invention by providing a CNC control means, a PLC control means and a PLC sequence simulation means which perform the necessary data exchange among themselves. In doing so, depending on the control data which are provided by a corresponding means, such as an input means, by the user or a data carrier, the CNC control means creates CNC data in correspondence with the corresponding control signals on the machine tool and/or the corresponding states of the machine tool.

In this inventive device the PLC simulation is of particular importance. In the present invention the same is realized by the interaction of a PLC control means for creating PLC control output data and a PLC sequence simulation means for creating PLC simulation data and PLC control input data depending on the PLC control output data and the machine tool data. Here, it is the function of the PLC control means to create PLC control output data. These may be retrieved, for example, by corresponding sentences of a CNC part program and correspond to the instructions referring to machining states of the machine tool. As a reaction thereto, the PLC sequence simulation means creates PLC control input data which notify the PLC control means of the operating state of the machine tool. This enables the description of a complete sequence of the processing operations including the instructions output by the CNC and PLC controls.

Moreover, the PLC sequence simulation means generates PLC simulation data describing the PLC controlled movement sequences. The overall simulation means receives the PLC simulation data and the CNC data and thus, in combination with the CNC control means, the PLC control means and the PLC sequence simulation, makes it possible for the first time to simulate all movement sequences which can be carried out on a real machine tool.

Based on this concept, the inventive device provides a structure which makes it possible in a simple manner to implement all functions in the simulation such as they exist on a real machine tool. For example, machining functions such as override or manual moving operations of table, head and spindle may be displayed in the simulation in a simple manner by suitable modules. This allows the provision of a basic structure in relation to the technology of data processing, which is largely adapted to the real data processing sequences on the machine tool and can be successively amended, if requested.

In other words, the interaction between the CNC control means, the PLC control means, the PLC sequence simulation means and the overall simulation device in particular realizes a holistic simulation approach wherein a simulation particularly close to reality may be provided due to the consideration of the corresponding partial functions when machining the workpiece.

Through this, the inventive simulation device can fulfil tasks which have been closed to conventional simulation approaches so far. For example, all imminent collisions may be detected, especially the collisions which may be caused by PLC sequences. The automatic change of tools (tool automation) and the automatic change of workpieces (workpiece automation), for example, may be simulated as well. In this way it is possible to detect collisions, for example, which are due to the fact that a tool change is to be performed when the flap to the tool magazine is closed, that a tool is to be received in the spindle although another tool is still clamped therein or that a tool taken from the spindle is to be inserted into a spot in the tool magazine where another tool is already placed. Within the frame of the simulation of the workpiece automation the pallet storage, for example, which may be built e.g. in a circular form or in a shelf form, may also be simulated. Collisions may be detected which are caused, for example, by the fact that a tool is incorrectly clamped on the pallet such that there would be an impact when the pallet is introduced into the machine tool.

Moreover, the inventive simulation device enables a realistic estimation of machine utilization times due to the fact that the PLC control means is able to reproduce the behavior of a real PLC controller and interacts with a PLC sequence simulation means which allows it to realistically simulate the timely behaviour of the PLC sequences. As a large part of the production costs of a workpiece is linked to the machine utilization times the inventive simulation device makes it possible to quickly and accurately predict costs for the production of a workpiece.

Preferably, the CNC control means comprises a CNC program created from the source code of a CNC program of a real CNC control.

The background thereof is that manufacturers of controls for real machine tools program their CNC programs in a high-level programming language and compile them for the operating system of the CNC control. According to the invention, in the present embodiment this CNC program in the high-level programming language is used and a version of the CNC program created therefrom that is executable on a commercially available computer. This makes it possible that the CNC control means is an exact replication of the real CNC control means, which can be executed on a PC.

Preferably, the PLC control means comprises a PLC program of a real PLC control or a PLC program created from the source code of a PLC program of a real PLC control.

The background in this case is similar to that of the CNC program. If the PLC program of the real PLC control can be directly executed by the PLC control means, the PLC program of the real PLC control is adopted without any change in the present embodiment. Frequently, however, the manufacturers of PLC control means program the PLC program in a high-level programming language and compile this program for the operating system of the PLC control. In this case it is preferred to use exactly this PLC program in the high-level programming language and to compile or interpret it such that it is executable on a commercially available computer. This makes it possible that the PLC control means is also an exact replication of the real PLC control means.

In a preferred embodiment the means for providing control data comprises a storage means for storing at least one CNC part program, the CNC part program being executable on a real machine tool.

This makes it possible that in the inventive device a CNC part program is stored and used which corresponds to a CNC part program such as is executed on a real machine tool. All in all, the advantage results that the real machine tool can be simulated in a manner close to reality.

Preferably, the means for providing control data furthermore comprises an input means for the manual input of control data by the user for changing the operating state of the machine tool.

Due to this input means the advantage is obtained that the user may manually input control instructions which will then be reproduced within the frame of the overall simulation. For example, he or she may open the door of the machine tool chamber virtually, may make the head and spindle travel manually or may start or end the coolant supply. This functionality makes it possible to train operating staff for CNC machines. During the educational process the trainees cannot damage the machine tool because it is only simulated. Yet the virtual image of the machine tool is realistic. All manual inputs which a user would or would have to enter into a real machine tool may also be entered into the simulated machine tool. Thus, a very realistic, yet cost-efficient and risk-fee training becomes possible.

Preferably, the input means comprises an override input means for inputting an override as a ratio of the feed rate and rotary speed, respectively, according to the CNC part program and the changed feed rate and rotary speed, respectively, when executing the CNC part program on the machine tool. By means of this override input means the override tuning knob of a real machine tool is emulated. Using this override turning knob the user of a CNC machine tool makes a newly installed CNC part program run slowly at first to be better able to check the sequence and prevent collisions, if any.

Furthermore, in an advantageous embodiment the input means comprises a manual travel path input means for inputting the control data for manually moving the spindle, the head and/or the table. By means of this manual travel path input means the user of the simulation may move the spindle, the head and/or the table manually as on a real machine tool. Therefore, the simulation realistically displays a real machine tool also in this regard.

Moreover, the input means may comprise a clamping input means for inputting control data for clamping workpieces. This clamping input means enables the user of the simulation to practice the clamping of workpieces and to prepare the virtual image of the machine tool for the sequence of a CNC part program.

In addition, the input means preferably comprises a zero-point determination input means for determining a zero point. Using this zero-point determination input means the user of the simulation may determine zero points like on a real machine tool. The determination of the zero point of a workpiece plays an important role in practical operations in particular. By means of the zero-point determination input means the user is able to practice the determination of zero points.

In an advantageous embodiment the input means furthermore comprises a switch-on procedure input means for manual inputting control data to be input by the operator of the machine tool after a real machine tool has been switched on in order to achieve a state of operational readiness of the machine tool. Using this switch-on procedure input means all manual inputs may be made which are necessary in a real machine tool in order to bring the machine tool into a state of operational readiness after the machine tool has been switched on. These switch-on operations include, for example, the opening and closing of the door to be able to insert a tool, the clamping of tools, and the like.

In a preferred embodiment the input means comprises a real operator's desk of a real machine tool, which preferably comprises a CNC operating panel and/or a PLC operating panel. Due to the inventive combination of the real operator's desk on the one hand and the holistic simulation of the machining operations rendered possible by the inventive simulation device on the other hand a closeness to reality may be suggested to the user which could not be achieved rudimentarily because he or she directly has the impression that he or she is working at a real machine tool. This allows e.g. for a realistic training.

Moreover, the input means may comprise a virtual operator's desk as a virtual image of a real operator's desk. Preferably, the virtual operator's desk can be operated by using a connected mouse or via a touch-sensitive monitor. Due to the virtual operator's desk a realistic operating situation may be created even for those users who do not wish to buy a real operator's desk.

Preferably, the PLC control means may create PLC control output data depending on the control data. The advantage thereof is that the control data input via the input means, such as the instruction to open the door of the machine tool chamber, may be executed by the PLC control means.

However, the PLC control means not only becomes active when it directly executes control data, but the situation that the CNC control means executes the CNC part program, and in doing so delegates the execution of some instructions to the PLC control means, occurs more often.

In a preferred embodiment the inventive device is adapted to enable the selection of a sentence within the CNC part program through the input means, the overall simulation means creating the overall simulation data as of the start of the CNC part program and the visualization means visualizing the overall simulation data as of the selected sentence so as to display the sequence for machining a workpiece on the machine tool starting from the selected sentence.

Therefore, it is possible in this preferred embodiment to select a sentence within the CNC part program through the input means. The user thus signalizes that he or she would like to see the movement sequence as of this sentence. In order for a visualization to be able to start as of this point, it is necessary that firstly the state be created which the machine tool would have at this point in the part program. This is why the part program is run through from the start in a kind of fast track. The visualization, however, only starts as of the selected sentence. This possibility of starting the visualization at selectable sentences opens new didactic chances in the field of training.

Preferably, the display means comprises a real CNC display means of a real machine tool. Thus, the user's feeling to be standing at a real machine tool is further enhanced. A more realistic training becomes possible.

In addition, the display means may comprise a virtual CNC display means as a virtual image of a real CNC display means of a real machine tool. This means that a real CNC display means is imitated on a commercially obtainable display screen. This creates a realistic training situation even if no real CNC display means is available.

Preferably, the visualization means is adapted to visualize the overall simulation data three-dimensionally. This creates a realistic impression.

In a preferred embodiment the first storage means comprises a means for storing kinematics data for describing the kinematic behavior of the machine tool. The kinematics data comprise information describing how the machine tool behaves during movement. The kinematics data include, for example, times for the execution of specific movement sequences.

Furthermore, the first storage means may comprise a means for storing machine tool element data for creating a virtual image of machine tool elements. Moreover, the first storage means may comprise a means for storing configuration data for creating a image of the machine tool depending on the machine tool element data, the kinematics data and the configuration data.

By composing a virtual image of the machine tool from separate machine tool elements by means of the configuration data it becomes possible to display different types of machine tools in a particularly efficient manner because many machine elements are identical even on different types of machine tools. This means that the configuration data indicate how predetermined machine elements must be combined to obtain a complete machine model.

In a preferred embodiment the third storage means comprises a means for storing tool data for creating a virtual image of at least one tool. The result thereof is the advantage that the tools used by the machine tool can be modeled.

Preferably, the third storage means comprises a means for storing clamping means data for creating a virtual image of at least one clamping means. This allows the clamping means into which the workpieces are clamped to become modelable.

In a preferred embodiment the inventive device comprises a parameterization means for parameterizing the CNC control means and/or the PLC control means. Preferably, this parameterization means is adapted to parameterize the CNC control means and/or the PLC control means regarding at least one parameter of the group consisting of traveling range parameters, closed-loop control behavior parameters, compensation parameters, and tool magazine parameters. This parameterization means allows the parameterization of the CNC control means and/or the PLC control means like real CNC controls and/or PLC controls.

Preferably, the inventive device comprises an interface for the communication between the CNC control means and the overall simulation means. This interface may be realized on the basis of a middleware, such as DCOM or CORBA (Common Object Request Broker Architecture). It is preferred that the interface for the communication between the CNC control means and the overall simulation means is adapted to convert non-object-oriented CNC data obtained by the interface from the CNC control means into an object-oriented form before they are delivered to the overall simulation means.

This is particularly advantageous because the visualization means is preferably realized on the basis of OpenGL. OpenGL is object-oriented. In contrast thereto, many CNC programs of established CNC control means are programmed in C, that is, in a non-object-oriented language. Therefore it is necessary to convert non-object-oriented CNC data into an object-oriented form to generate interoperability between the CNC control means and the visualization means.

Preferably, the interface for the communication between the CNC control means and the overall simulation means comprises a filter means which filters the amount of the CNC data delivered by the CNC control means to the interface so that the overall simulation means obtains only a partial amount from the amount of the CNC data delivered by the CNC control means.

For example, the CNC control means may be adapted to deliver new CNC data every 15 milliseconds. If all CNC data were delivered to the overall simulation means, the overall simulation means would have to update the machine tool model every 15 milliseconds. This computational effort can hardly be accomplished in 15 milliseconds so that a simulation in real time will be very difficult. Only a partial amount of the CNC data is delivered to the overall simulation means via the filter means, e.g. the CNC data are passed on to the overall simulation means every 150 milliseconds, i.e. every tenth CNC data set. Even if only every tenth CNC data set is delivered it is possible to completely reproduce the movement sequence of the machine tool. The overall simulation means, however, needs to update the machine tool model less often so that less computational effort is necessary and it becomes possible to simulate in real time.

Preferably, the inventive device comprises an input means for inputting configuration data for the configuration of the filter means. By using this input means it is possible, for example, to determine how intensely the filter means is to filter the CNC data. There it is possible to input, for example, that every fifth CNC data set or every fifteenth CNC data set is to be delivered to the overall simulation means.

Preferably, the interface for the communication between the CNC control means and the overall simulation means comprises a synchronization means for synchronizing the communication between the CNC control means and the overall simulation means.

In a preferred embodiment the inventive device comprises an interface for the communication between the PLC control means and the PLC sequence simulation means. Preferably, the interface is adapted to enable synchronization between the PLC control means and the PLC sequence simulation means via a semaphore. The interface may comprise a synchronization means having a storage means and ensuring that the PLC control means writes all PLC control output data created during a period into the storage means before the PLC sequence simulation means reads the PLC control output data out of the storage means. In the same manner, the interface may comprise a synchronization means having a storage means and ensuring that the PLC sequence simulation means writes all PLC control input data created during a period into the storage means before the PLC control means reads the PLC control input data out of the storage means.

In this way it is ensured that the PLC control means always writes a complete set of PLC control output data first before the PLC sequence simulation means reads them out. This means that atomicity of all output data of one period is obtained. This is desirable in order to display the behavior of a real PLC control means even more realistically. In the opposite direction as well it is achieved that the PLC sequence simulation means respectively creates a complete set of PLC control input data and writes them into the storage means before the PLC control means reads them out. In this case, too, atomicity of all PLC control input data of one period is obtained.

In a preferred embodiment the inventive device comprises an interface for the communication between the overall simulation means and the PLC sequence simulation means. It may be realized on the basis of a middleware. Preferably, the interface for the communication between the overall simulation means and the PLC sequence simulation means comprises a filter means which filters the amount of the PLC data delivered by the PLC sequence simulation means to the interface so that the overall simulation means obtains only a partial amount from the amount of the PLC data delivered by the PLC sequence simulation means. In this case, too, filtering is carried out again so that the overall simulation means does not have to update the machine tool model too often and thus a simulation in real time is made more difficult due to the high computational effort. Preferably, the filter means may in turn be configured via an input means so that an adjustment how intensely the filter means filters the PLC data may be made. Preferably, the interface for the communication between the overall simulation means and the PLC sequence simulation means comprises a synchronization means for synchronizing the communication between the overall simulation means and the PLC sequence simulation means.

All interfaces mentioned may be adapted as a remote interface. A remote interface is adapted to enable a remote communication between communication partners located at different places. This allows a distribution of the individual means to several computers. For example, it may be advantageous to operate the overall simulation means and the visualization means on a first computer while the PLC control means, the CNC control means and the PLC sequence simulation may be carried out on a second computer. This is an advantage because the overall simulation means and the visualization means require very much computation capacity. This means that by the fact that the interface between the PLC sequence simulation means and the overall simulation means as well as the interface between the CNC control means and the overall simulation means are adapted as a remote interface it is possible to achieve a faster execution of the overall simulation.

Furthermore, all mentioned interfaces may enable the call of techniques made available by one communication partner to the other communication partner. This allows the individual means not only to exchange data among themselves but also to mutually use their techniques.

Preferably, the device according to the invention comprises a collision detection means adapted to detect collisions, depending on the overall simulation data, between the machine tool including the resources and the workpiece. In this way it is possible to check CNC part programs or also manually entered control data whether they lead to collisions. In particular the resources include the used tools.

In a preferred embodiment the inventive device comprises a traveling range check means for checking whether a predetermined position can be approached by the machine tool. The predetermined position may result, for example, from the CNC part program or it may have been input manually. By means of the traveling range checking means it is possible to find out, for example, whether a specified workpiece can be produced on a certain machine tool. This allows the use of the inventive device for sales support. Sales representatives are able to present the machine tool virtually, for example on their laptops, for clients who intend to buy a machine tool, and they are able to display to the client how the requested workpieces are manufactured by this machine tool. A check may be made whether the machine tool is big enough and suited for the production of the desired workpiece.

In a preferred embodiment the visualization means is adapted to display the overall simulation data at a speed which during a predetermined period of time is at a constant ratio to the speed of the real sequence for machining a workpiece on a machine tool. In particular, the visualization means may be adapted to display the simulation data in real time. In this way it is possible to realistically visualize sequences for machining a workpiece on a machine tool so that the observer gains a realistic impression of how the machining of a workpiece on a machine tool would proceed in reality.

Preferably, the means for providing control data is adapted to provide control data for executing a sequence for machining a workpiece on a 5-axis machine tool. The visualization of machining sequences is particularly advantageous for 5-axis machine tools because due to the five axes it is especially difficult for a user to imagine the machining sequence.

In a preferred embodiment the inventive device is adapted to simulate, during a first period of time, a sequence for machining a workpiece on a first machine tool and, during a second period of time, a sequence for machining a workpiece on a second machine tool.

According to the invention, this may be achieved by replacing the CNC control means and the PLC control means relating to a first machine tool, completely, i.e. above all including the CNC program, the PLC program and the parameters, by a CNC control means and a PLC control means relating to a second machine tool. This makes it possible, for example, that in the first case a Siemens control and in the second case a Heidenhain control is used and displayed, respectively.

Thus, it becomes possible to simulate different machine tools and/or different machine tool controls. For example, this leads to the advantage that apprentices can be trained on several machine tools and several machine tool controls in a simple and cost-efficient manner.

Alternatively, the ability to simulate different machine tools can be achieved by the possibility to exchange the PLC program and the parameterization of the CNC control means.

This makes it possible, for example, to simulate different machine tools of the same machine tool manufacturer, such as Deckel-Maho-Gildemeister, for example, in a simple and cost-efficient manner.

Preferably, the inventive device comprises a control selection means for selecting a control to be used within the frame of the simulation of a sequence for machining a workpiece on a machine tool. For example, a control may be chosen by selecting a corresponding CNC control means and a corresponding PLC control means or by selecting a corresponding PLC program and corresponding parameters. Thus, a user of the simulation means may conveniently select a control and simulate a sequence for machining a workpiece on a machine tool based on the selected control.

The device according to the invention has many advantages. It allows a realistic simulation of a machine tool. Thus, collisions can be better detected. Particularly, it is possible to detect such collisions which would be caused by PLC movement sequences. The holistic simulation, that is, the inclusion of all aspects of the machine tool in the simulation, makes a better prediction of machine utilization times possible. Users of the machine tool can be trained with the help of the simulation. Training companies no longer have to absolutely buy a machine tool but can use the simulation. This reduces the employment of capital. At the same time it is possible to simulate different machine tools and different controls of various control manufacturers with the aid of the simulation. Damage to machine tools by inexperienced users is prevented because the virtual machine tool of the simulation cannot be damaged. In addition, the simulation may be used for sales support. Machine tools may be visualized, for example on a laptop, for clients who may want to buy a machine tool. Moreover, it is possible to draw conclusions for the construction of machine tools from the results of the simulation. This allows constant improvement of the machine tools. At the same time, new ideas for the construction of machine tools can be tested on the model without taking any risks.

Furthermore, the invention comprises a method for simulating a sequence for machining a workpiece on a machine tool. According to the invention, the method comprises the steps of providing machine tool data for creating a virtual image of a machine tool, providing workpiece data for creating a virtual image of at least one workpiece, providing resource data for creating a virtual image of at least one resource, providing control data for performing a sequence in conjunction with the machining of a workpiece on a machine tool, creating CNC data depending on the control data, creating PLC control output data, creating PLC simulation data and PLC control input data depending on the PLC control output data and the machine tool data, creating overall simulation data concerning the sequence for machining a workpiece on the machine tool depending on the CNC data, the PLC simulation data, the machine tool data, the workpiece data and the resource data, and visualizing the overall simulation data, comprising the step of displaying the sequence for machining a workpiece on the machine tool.

This inventive method for the simulation of a sequence for machining a workpiece on a machine tool offers the some advantages as the inventive device.

Preferably, the method comprises the step of creating a CNC program from the source code of a CNC program of a real CNC control. Furthermore, the method may comprise the step of providing a PLC program of a real PLC control or the step of creating a PLC program from the source code of a PLC program of a real PLC control.

In an advantageous embodiment the step of providing control data comprises the step of providing a CNC part program, the CNC part program being executable on a real machine tool.

Preferably, the step of providing control data comprises the step of manually inputting control data by the user for changing the operating state of the machine tool.

The step of manually inputting control data may comprise the step of inputting an override as a ratio of the feed rate according to the CNC part program and the changed feed rate when executing the CNC part program on the machine tool.

Likewise, the step of manually inputting control data may comprise the step of inputting control data for manually moving the spindle, the head and/or the table.

Preferably, the step of manually inputting control data also comprises the step of inputting control data for clamping workpieces.

In a particularly preferred embodiment the step of manually inputting control data comprises the step of inputting control data for determining a zero point.

Preferably, the step of manually inputting control data comprises the step of inputting control data to be input by the operator of the machine tool after a real machine tool has been switched on in order to achieve a state of operational readiness of the machine tool.

In a preferred embodiment, in the step of manually inputting control data the inputs are made through a real operator's desk of a real machine tool comprising a CNC operating panel and/or a PLC operating panel.

Likewise, in the step of manually inputting control data inputs are made through a virtual operator's desk as a virtual image of a real operator's desk.

Preferably, in the step of creating PLC control output data PLC control output data are created depending on the control data.

In a preferred embodiment the method comprises the steps of inputting a selection of a sentence within the CNC part program, creating overall simulation data from the start of the CNC part program and visualize the overall simulation data as of the selected sentence so as to display the sequence for machining a workpiece on the machine tool starting from the selected sentence.

Preferably, in the step of displaying the sequence for machining a workpiece on the machine tool the displaying takes place through a real CNC display means of a real machine tool.

As an alternative or addition, it is possible that in the step of displaying the sequence for machining a workpiece on the machine tool the displaying is made through a virtual CNC display means as a virtual image of a real CNC display means of a real machine tool.

Preferably, in the step of visualizing the overall simulation data the overall simulation data are visualized three-dimensionally.

The step of providing machine tool data may comprise the step of providing kinematics data for describing the kinematic behavior of the machine tool. Likewise, the step of providing machine tool data may comprise the step of providing machine tool element data for creating a virtual image of machine tool elements. Preferably, the step of providing machine tool data comprises the step of providing configuration data for creating a image of the machine tool depending on the machine tool element data, the kinematics data and the configuration data.

In a preferred embodiment the step of providing resource data comprises the step of providing tool data for creating a virtual image of at least one tool. Likewise, the step of providing resource data comprises the step of providing clamping means data for creating a virtual image of at least one clamping means.

In a preferred embodiment the inventive process comprises the step of parameterizing the step of creating CNC data and/or the step of creating PLC control output data.

Preferably, in the step of parameterizing the step of creating CNC data and/or the step of creating PLC control output data parameterizing takes place with regard to at least one parameter from the group consisting of a traveling range parameter, a closed-loop control behavior parameter, a compensation parameter, and a tool magazine parameter.

In a preferred embodiment the inventive method comprises the step of communicating CNC data from a CNC control means to an overall simulation means.

Preferably, in the step of communicating CNC data from a CNC control means to an overall simulation means the communication takes place via a middleware.

The step of communicating CNC data from the CNC control means to the overall simulation means may comprise the step of converting non-object-oriented CNC data into an object-oriented form.

Preferably, the step of communicating CNC data from the CNC control means to the overall simulation means comprises the step of filtering the amount of the CNC data so that the overall simulation means obtains only a partial amount from the amount of the CNC data communicated by the CNC control means. The inventive method may comprise the step of configurating the step of filtering the amount of the CNC data by inputting configuration data.

In a preferred embodiment the inventive method comprises the step of communicating PLC control output data and PLC control input data between a PLC control means and a PLC sequence simulation means.

The step of communicating PLC control output data and PLC control input data between the PLC control means and the PLC sequence simulation means may comprise the step of synchronizing the PLC control means and the PLC sequence simulation means via a semaphore.

Preferably, in the step of communicating PLC control output data and PLC control input data between the PLC control means and the PLC sequence simulation means the PLC control means writes all PLC control output data created during a period into a storage means before the PLC sequence simulation means reads the PLC control output data out of the storage means.

Preferably, in the step of communicating PLC control output data and PLC control input data between the PLC control means and the PLC sequence simulation means the PLC sequence simulation means writes all PLC control input data created during a period into the storage means before the PLC control means reads the PLC control input data out of the storage means.

In a preferred embodiment the inventive process comprises the step of communicating PLC simulation data between the PLC sequence simulation means and the overall simulation means.

Preferably, in the step of communicating PLC simulation data between the PLC sequence simulation means and the overall simulation means communication takes place via a middleware.

The step of communicating PLC simulation data between the PLC sequence simulation means and the overall simulation means may comprise the step of filtering the amount of the PLC simulation data so that the overall simulation means obtains only a partial amount from the amount of the PLC simulation data communicated by the PLC sequence simulation means.

Preferably, in at least one of the communication steps remote communication takes place between communication partners located at different places.

Preferably, at least one of the communication steps comprises the step of calling a technique made available by one communication partner to the other communication partner.

In an advantageous embodiment the inventive method comprises the step of detecting collisions between the machine tool including the resources and the workpiece depending on the overall simulation data.

Furthermore, the inventive method may comprise the step of checking whether a predetermined position can be approached by the machine tool.

Preferably, in the step of visualizing the overall simulation data the overall simulation data are displayed at a speed which during a predetermined period of time is in a constant ratio to the speed of the real sequence for machining a workpiece on a machine tool.

Preferably, in the step of visualizing the overall simulation data the overall simulation data are displayed in real time.

In a particularly preferred embodiment in the step of providing control data control data for executing a sequence for machining a work piece on a 5-axis machine tool are provided.

In a preferred embodiment the inventive method comprises the step of providing a first CNC control means and a first PLC control means for simulating a sequence for machining a workpiece on a first machine tool and providing a second CNC control means and a second PLC control means for simulating a sequence for machining a workpiece on a second machine tool. Furthermore, the method according to the invention may comprise the step of providing a first PLC program and first parameters for parameterizing the CNC control means for simulating a sequence for machining a workpiece on a first machine tool and providing a second PLC program and second parameters for parameterizing the CNC control means for simulating a sequence for machining a workpiece on a second machine tool. Preferably, the inventive method comprises the step of selecting a control to be used within the frame of the simulation of a sequence for machining a workpiece on a machine tool.

Furthermore, the invention comprises a computer program product comprising a computer-readable medium and a computer program stored therein, the computer program being stored in the form of a sequence of states, the sequence of states corresponding to instructions adapted to be processed by a data processing medium of a data processing means so that a device according to the invention is formed or the inventive method for simulating a sequence for machining a workpiece on a machine tool is performed.

The PLC sequence simulation means described within the frame of the description of the inventive device requires data on the timely behavior of the simulated machine tool in order to be thus able to simulate the PLC sequences as regards time. This is why the invention furthermore comprises a method for creating PLC machine tool sequence data, comprising the steps of creating a sequence of PLC control data, the sequence comprising at least one PLC control datum, determining an initial state and an end state for each PLC control datum of the sequence, the initial state and the end state relating to the PLC control input data, providing a measuring unit adapted to measure a period of time between the occurrence of the initial state and the occurrence of the end state of each PLC control datum of the sequence, executing the sequence of PLC control data on a real machine tool by a real PLC control unit, the measuring unit measuring the period of time between the occurrence of the initial state and the occurrence of the end state for each PLC control datum of the sequence, creating PLC machine tool sequence data from the measuring data of the measuring unit, and storing the PLC machine tool sequence data.

The background of this method is that a machine tool includes actuators and sensors. The actuators are controlled by the PLC control means through PLC control output data. The PLC control means receives PLC control input data back from the sensors. It is the object of the method for creating PLC machine tool sequence data to generate data which provide information on when the sensors of the real machine tool generate which PLC control input data as a response to PLC control output data with which the PLC control means has driven the machine tool.

The advantage of the method for creating PLC machine tool sequence data is that by using this method it is possible to generate data that display the real behavior of a machine tool as regards time when PLC control instructions are executed.

Furthermore, the invention comprises a PLC sequence simulation means comprising a means for providing PLC machine tool sequence data, a clocking means for clocking the sequence simulation of the machine tool, the PLC sequences of the machine tool being described by the PLC machine tool sequence data particularly as regards time, inputs for receiving PLC control output data for controlling actuators of the machine tool, outputs for simulating output signals of sensors of the machine tool, an internal sequence simulation means for creating PLC simulation data and PLC control input data depending on the PLC control output data received through the inputs, on the PLC machine tool sequence data and on the clocking, and an output means for outputting the PLC simulation data and for outputting the PLC control input data through the outputs.

The advantage of the inventive PLC sequence simulation means is that it makes it possible to simulate the PLC sequences being run on a real machine tool in an appropriate manner, particularly as regards time.

Furthermore, the invention comprises a computer program product comprising a computer-readable medium and a computer program stored therein, the computer program being stored in the form of a sequence of states, the sequence of states corresponding to instructions adapted to be processed by a data processing medium of a data processing means so that a PLC sequence simulation means according to the invention is formed.

Advantageous developments and further details of the present invention will be described below by means of various embodiments with reference to the Figures.

FIG. 3 shows a visualized machine tool with a virtual operator's desk inserted.

FIG. 4 shows an example of the visualization of a movement sequence.

FIG. 5 clarifies how realistic the visualization is of what a user of a real machine tool would see.

Figure 6:
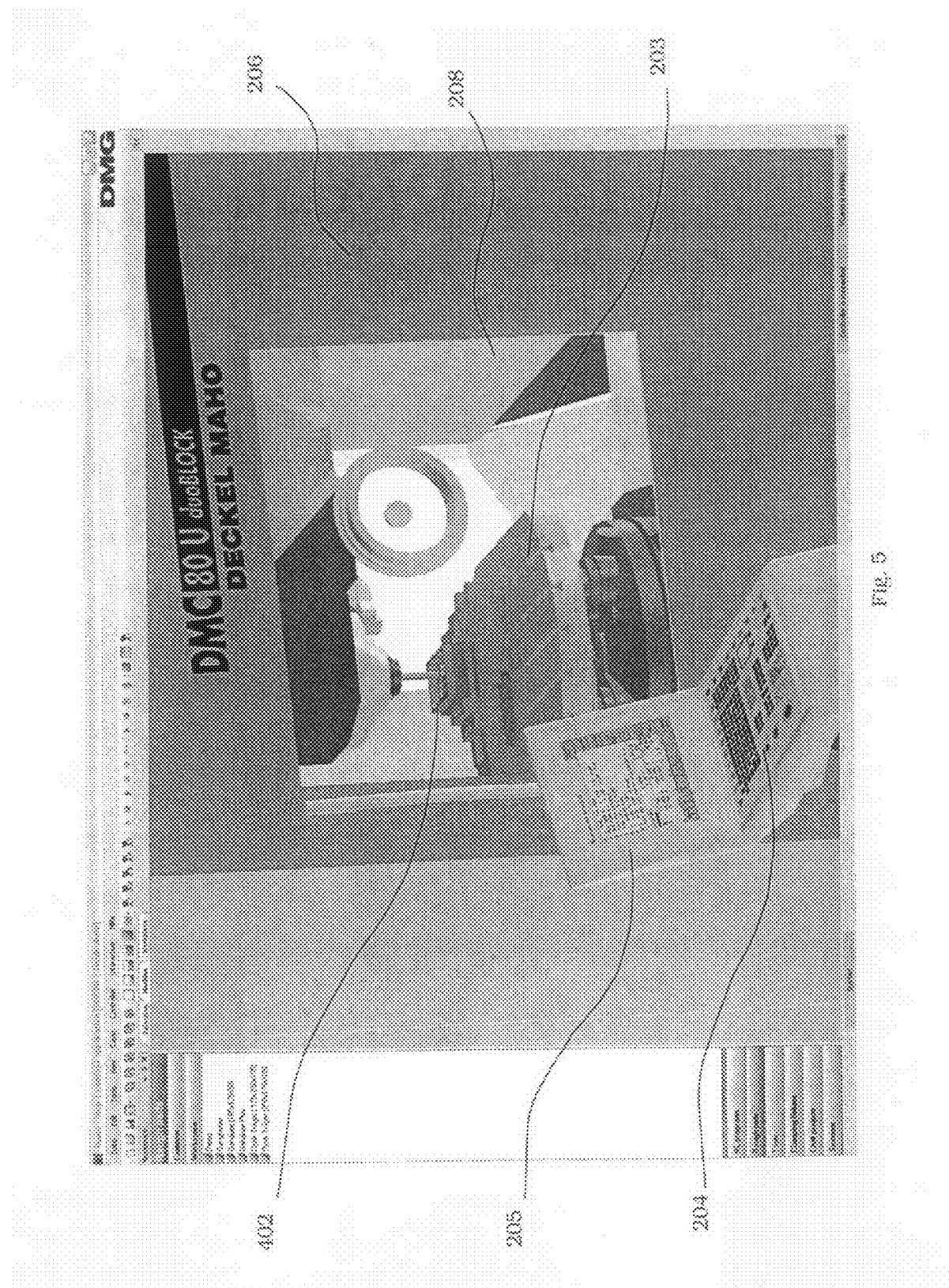
Figure 6:
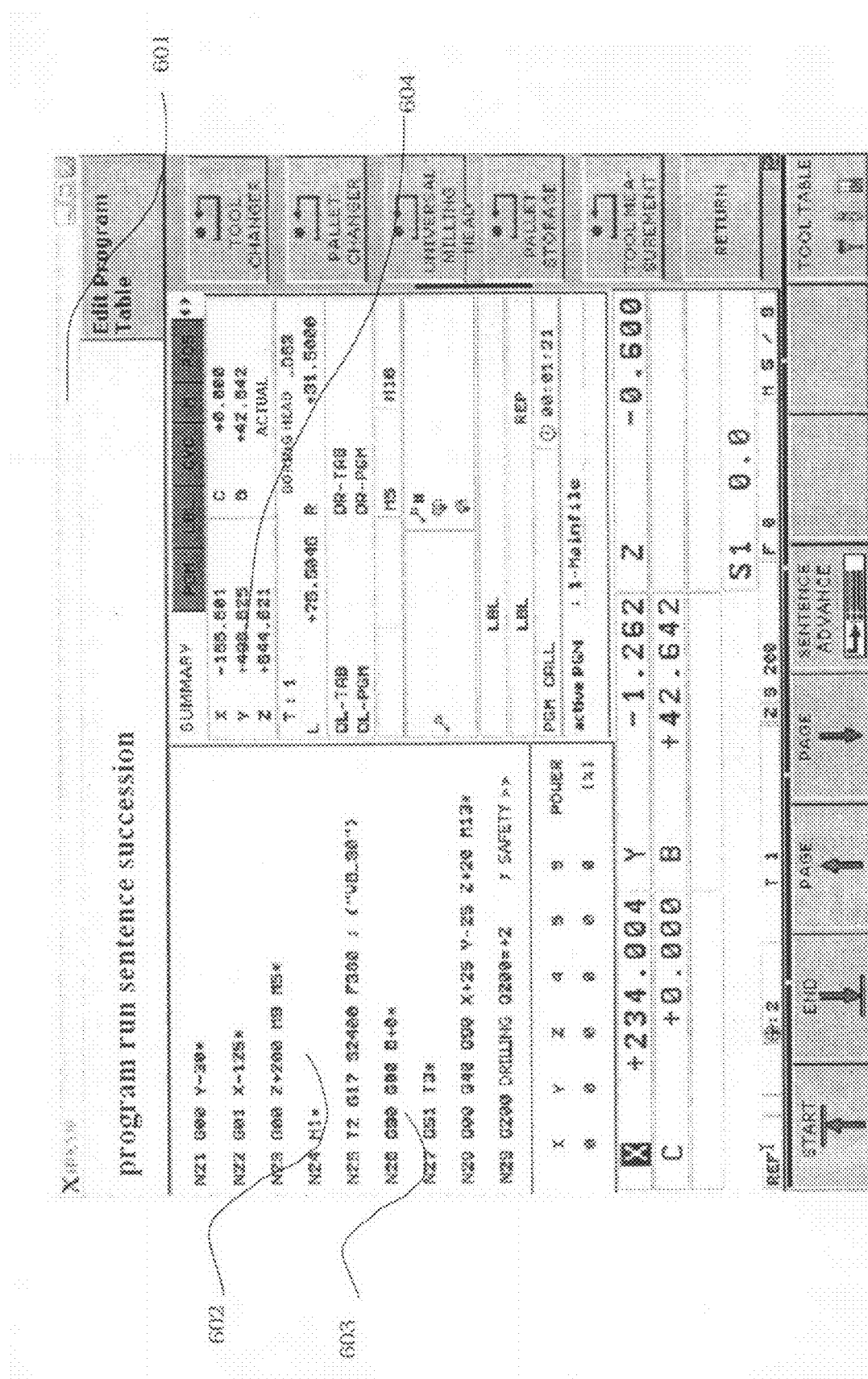

FIG. 6 shows a virtual CNC display means.

Figure 7:
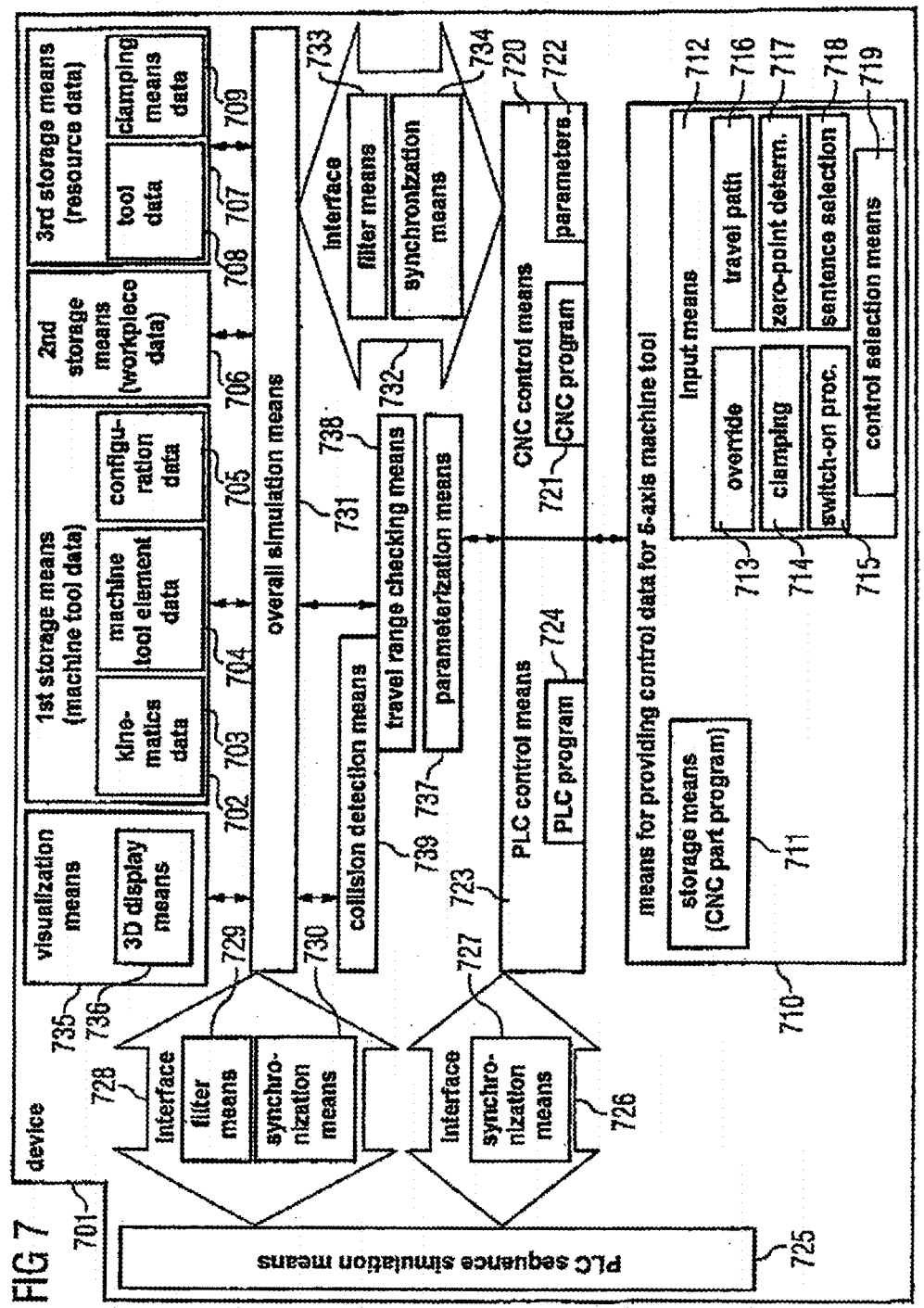

FIG. 7 shows an embodiment of the inventive device as a diagram.

FIG. 8 shows a first part of the inventive method for simulating a sequence for machining a workpiece on a machine tool.

FIG. 9 shows a second part of the inventive method for simulating a sequence for machining a workpiece on a machine tool.

FIG. 10 shows a third part of the inventive method for simulating a sequence for machining a workpiece on a machine tool. In particular, the creation of CNC data and PLC simulation data is illustrated.

FIG. 11 shows a fourth part of the inventive method for simulating a sequence for machining a workpiece on a machine tool. In particular, the creation and visualization of overall simulation data is illustrated.

FIG. 12 shows an embodiment of the inventive method for creating PLC machine tool sequence data.

FIG. 13 shows an embodiment of an inventive PLC sequence simulation means.

Figure 14:
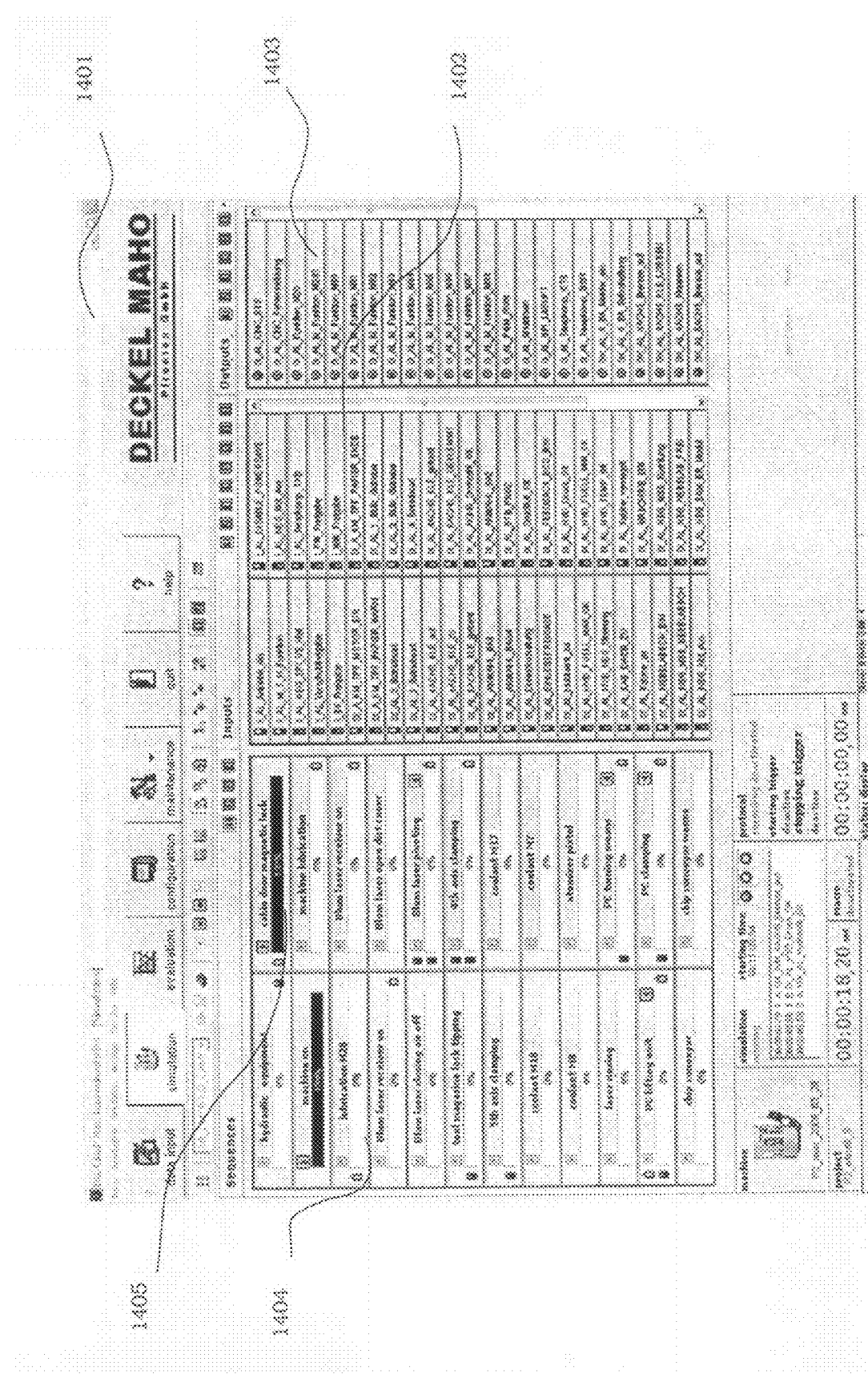

FIG. 14 shows the user interface of an embodiment of an inventive PLC sequence simulation means.

Figure 1:
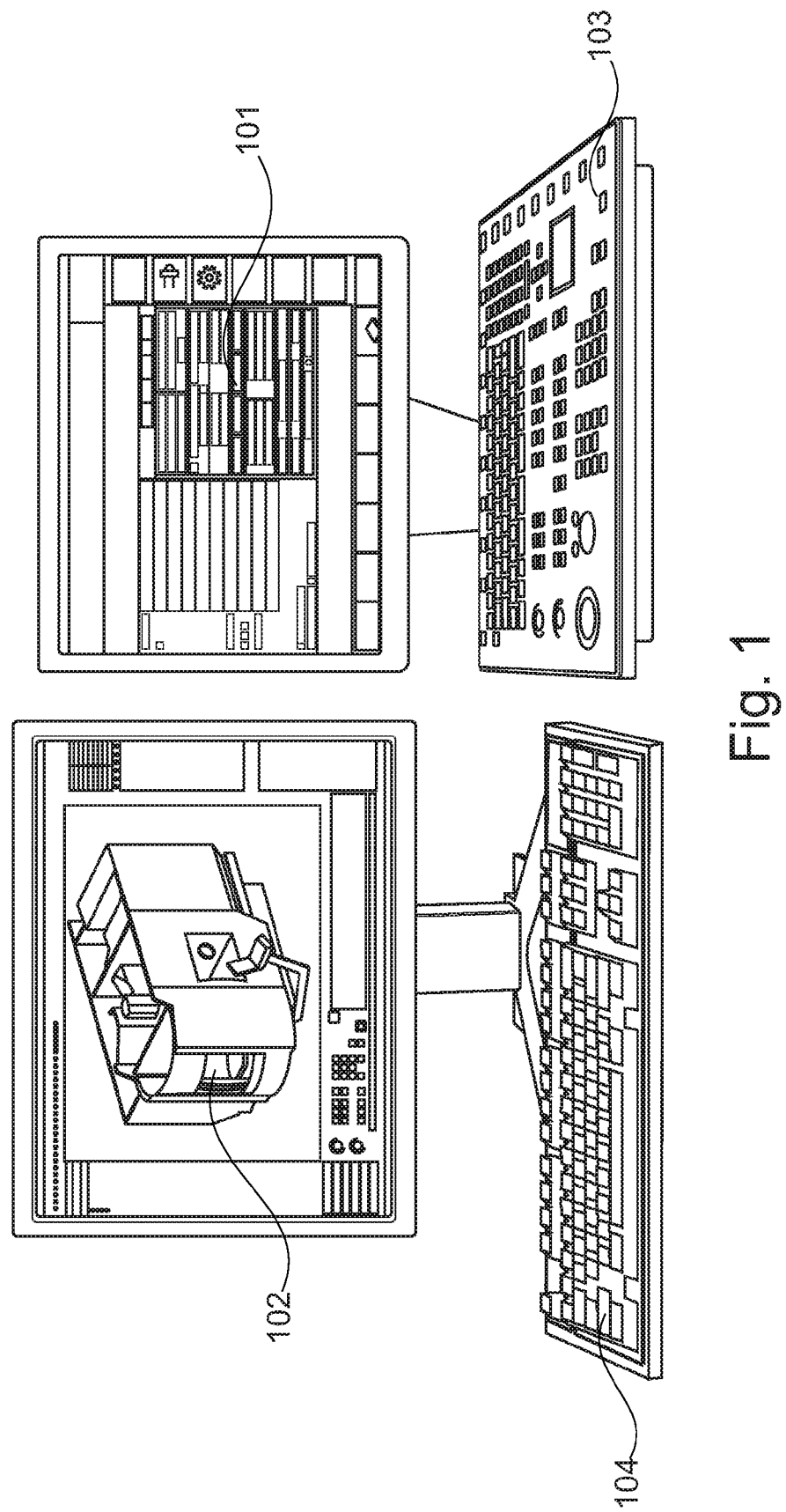
FIG. 1 shows an embodiment of the device according to the invention as a user would see it before him or her.

FIG. 1 shows an embodiment of a device according to the invention. Particularly, an illustration is given of what a user of the inventive device sees in front of himself or herself in the case of the present embodiment. The user sees a first display means 101 which shows a virtual CNC display means. On the left hand side thereof in the embodiment, there is a second display means 102 for displaying a virtual image of the machine tool. A real operator's desk 103 of a real machine tool is provided to the user. Additionally, he or she may enter data via a keyboard 104.

Figure 2:
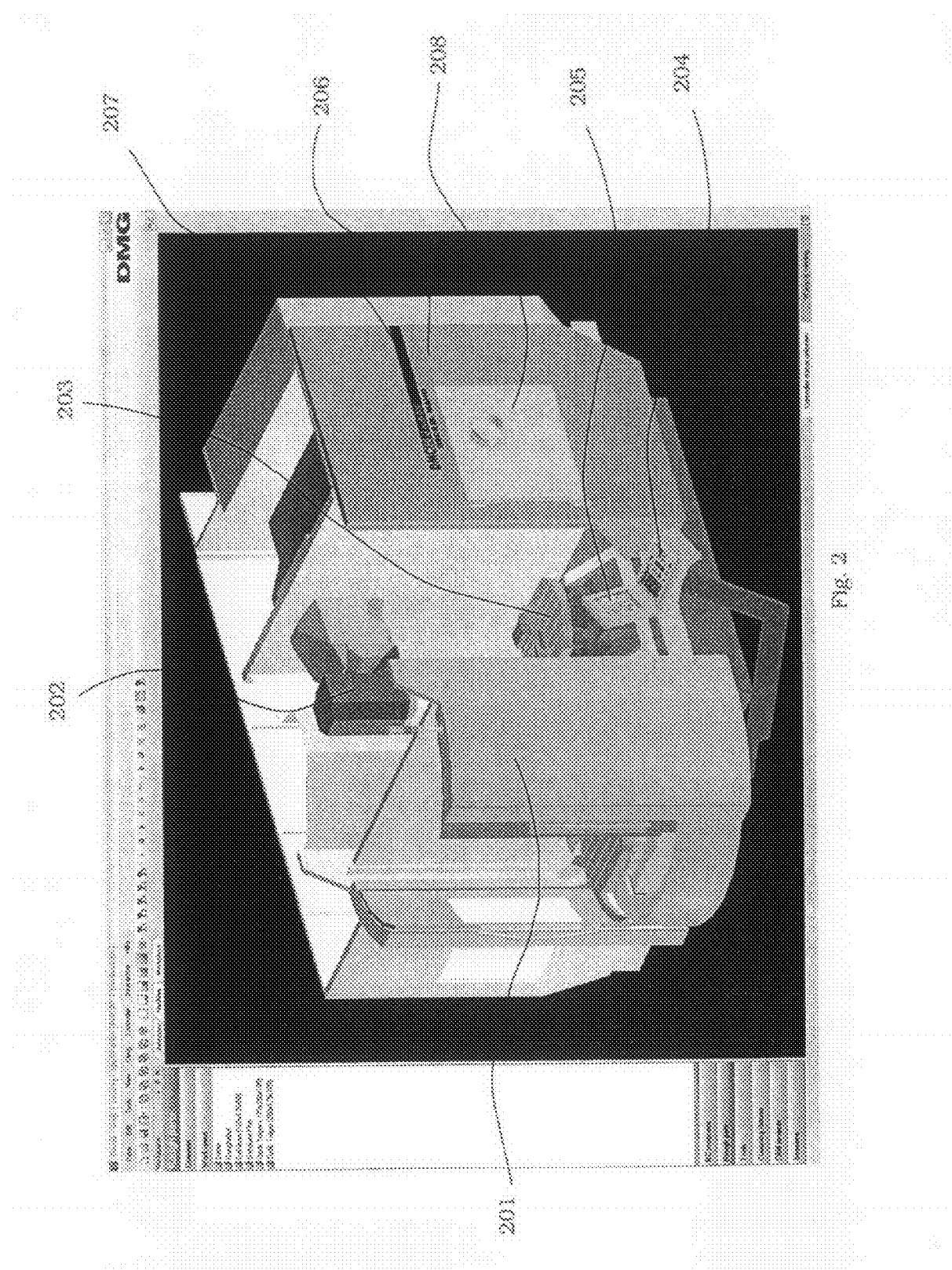
FIG. 2 shows an example of a visualized machine tool.

FIG. 2 shows an example of a virtual image of a machine tool in greater detail. Substantially, all the components can be seen that would also be seen on a machine tool. For example, the machine tool chamber 201 is visualized. Further, the machining head 202 of the machine tool and the corresponding table 203 for receiving the workpiece can be seen. Likewise, a CNC operator's desk 204 and a CNC display means 205 can be seen. Even the door of the machine tool chamber 206 including the type designation 207 of the machine tool and the window 208 of the door is shown. This clarifies that a very realistic image of a machine tool is presented to the user of the device according to the invention.

FIG. 3 shows the virtual image of the machine tool of FIG. 2 with an additional virtual operator's desk 301. The virtual operator's desk comprises a CNC operating panel 302 and a PLC operating panel 303. Reference numeral 304 denotes an override turning knob.

FIG. 4 shows that in this embodiment many elements of the machine tool can be hidden. In the example as shown, the machine tool chamber 201 can no longer be seen so that the user has an unobstructed view of the table 203. The head of the machine tool 202 has traveled in to such an extent that the clamped tool 401 plunges into the workpiece 402. The workpiece 402 is fixed on the table 203 through the clamping means 403. The material 404 removed from the workpiece 402 is visualized in the virtual image of the machine tool. Altogether, the user may see the whole movement sequence for machining the workpiece on the machine tool in this setting.

FIG. 5 makes clear that a user of the device for simulation may gain a realistic impression of what he or she would see when standing at a real machine tool. The user will stand at the virtual machine tool and look at the table 203 of the machine tool through the window 208 in the door 206. There the user will see the machining sequence on the workpiece 402. At the same time, the user will see the operator's desk 204 and the CNC display means 205.

FIG. 6 shows an example of a virtual CNC display means 601. Particularly, the virtual CNC display means 601 shows the CNC part program 602 to be executed which consists of individual sentences 603. Further, among other things, the position of the machine tool head can be seen in field 604.

FIG. 7 shows a schematic structure of an embodiment of an inventive device for simulating a sequence for machining a workpiece on a machine tool. The device 701 comprises a first storage means 702, which stores machine tool data. The first storage means comprises further storage means. One storage means stores kinematics data 703. Another storage means stores machine tool element data 704. Still another storage means included in the first storage means stores configuration data 705. Further, the device 701 comprises a second storage means 706 which stores workpiece data. Resource data are stored in a third storage means 707 included in the device 701. The third storage means 707 comprises another storage means 708 for storing tool data and still another storage means 709 for storing clamping means data.

The device 701 comprises a means for providing control data 710, in the present example control data for a five-axis machine tool. This means for providing control data 710 comprises a storage means 711 which stores at least a CNC part program. Further, the means for providing control data 710 comprises an input means 712. The input means 712 comprises a plurality of further input means. Particularly, the input means 712 comprises an input means for inputting an override 713, an input means for inputting control data for clamping workpieces 714, an input means for inputting control data in order to perform a switch-on procedure 715, an input means for manually inputting a travel path 716, an input means for inputting control data in order to determine a zero point 717, an input means for selecting a sentence within the CNC part program 718 and an input means for selecting a control 719, which is intended to be used within the frame of a simulation of a sequence for machining a workpiece on a machine tool. This enumeration of input means included in the input means 712 is not to be understood to be final, but only serves to illustrate some aspects of the input means.

Further, the device for simulating a sequence for machining a workpiece on a machine tool 701 comprises a CNC control means 720. The CNC control means 720 comprises a CNC program 721. Further, in the present embodiment the CNC control means comprises parameters 722 which parameterize the CNC control means.

Additionally, the device 701 comprises a PLC control means 723, which comprises a PLC program 724. The PLC program pictures a real PLC control of a real machine tool.

Furthermore, the device 701 comprises a PLC sequence simulation means 725 for simulating the PLC sequences on a machine tool. The PLC control means 723 communicates with the PLC sequence simulation means 725 through an interface 726. This interface comprises a synchronization means 727, which causes the PLC control means 723 to always write a complete sentence of PLC control output data first before the PLC sequence simulation means 725 reads them out.

In the opposite direction, the synchronization means 727 ensures that the PLC sequence simulation means 725 always writes a complete sentence of PLC control input data first before the PLC control means 723 reads out the PLC control input data.

Among other things, the PLC sequence simulation means 725 creates PLC simulation data. The PLC sequence simulation means 725 communicates these PLC simulation data to an overall simulation means 731. The communication of the PLC simulation data is rendered via an interface 728 comprising a filter means 729 and a synchronization means 730. The filter means 729 provides for the amount of the PLC simulation data delivered by the PLC sequence simulation means 725 to the overall simulation means 731 to be adjustable. The synchronization means 730 synchronizes the communication between the PLC sequence simulation means 725 and the overall simulation means 731.

Furthermore, the overall simulation means 731 receives CNC data from the CNC control means 720 via the interface 732. The interface 732 in turn comprises a filter means 733 and synchronization means 734. This filter means 733 causes the amount of the CNC data provided by the CNC control means 720 to the overall simulation means 731 to be adjustable. The synchronization means 734 synchronies the communication between the CNC control means 720 and the overall simulation means 731.

The overall simulation means 731 creates overall simulation data regarding the sequence for machining a workpiece on the machine tool. In order to create the overall simulation data the overall simulation means 731 uses the PLC simulation data it receives from the PLC sequence simulation means 725, the CNC data it receives from the CNC control means 720, the machine tool data from the first storage means 702, the workpiece data from the second storage means 706, and the resource data from the third storage means 707.

The overall simulation means 731 passes on the created overall simulation data to a visualization means 735. This visualization means 735 comprises a 3D display means 736. By using the 3D display means 736 the visualization means 735 visualizes the machine tool including the workpiece and the resources as well as the mach sequence of the machine tool for machining the workpiece.

In addition the device 701 comprises a parameterization means 737 for parameterizing the CNC control means 720 and/or the PLC control means 723.

Depending on the overall simulation data it receives from the overall simulation means 731, a collision detection means 739 detects collisions between the machine tool including the resources and the workpiece.

Additionally, the device 701 comprises a travel range checking means 738 for checking whether a predetermined position can be approached by the machine tool.

FIG. 8 shows a first part of an embodiment of the method for simulating a sequence for machining a workpiece on a machine tool. In step 801 machine tool element data are provided. In step 802 machine tool kinematics data are provided. In step 803 the provision of configuration data follows. After that, tool data are provided in step 804. Next are the provision of clamping means data in step 805 and the provision of workpiece data in step 806. At point A in the method procedures are started off which are shown in FIG. 9 and FIG. 11.

FIG. 9 shows a second part of an embodiment of the method for simulating a sequence for machining a workpiece on a machine tool. In step 901 a CNC part program is provided. Subsequently, control data for clamping a workpiece are input by the user in step 902. After that, in step 903 the user enters control data for determining a zero point. At this point B the procedure clarified in FIG. 10 is initiated.

FIG. 10 illustrates a third part of an embodiment of the method for simulating a sequence for machining a workpiece on a machine tool. In step 1001 CNC data are created. These CNC data are communicated in step 1002. After that, either the creation of new CNC data follows (step 1001) or PLC control output data are created in step 1003. Subsequently, the created PLC control output data are communicated in step 1004. In step 1005 PLC simulation data and PLC control input data are created. These PLC simulation data and PLC control input data are communicated in step 1006. After that, the procedure jumps back either to step 1003 or to step 1001.

Of course, the procedure shown in FIG. 10 may be stopped, particularly by an input by the user or by reaching the end of the CNC part program.

FIG. 11 illustrates a fourth part of an embodiment of the method for simulating a sequence for machining a workpiece on the machine tool. In step 1101 overall simulation data are created. These overall simulation data are visualized in step 1102. In particular, the sequence for machining the workpiece on the machine tool is displayed. In step 1103 CNC data and PLC simulation data are received, as far as such exist. Subsequently, a return to step 1101 follows in which new overall simulation data are created on the basis of the newly received CNC data and the newly received PLC simulation data. The procedure shown in FIG. 11 may be stopped as well, preferably by an input by the user.

FIG. 12 shows ah embodiment of an inventive process for creating PLC machine tool sequence data. In step 1201 a sequence of PLC control data is generated. Subsequently, in step 1202 an initial state and an end state for each PLC control datum of the sequence is obtained. In step 1203 a measuring unit is provided. Subsequently, the sequence of PLC control data is executed on a real machine tool by using a real PLC control in step 1204. During the execution the time periods between the start of the initial state and the start of the end state for each PLC control datum of the sequence are measured by the measuring unit (Step 1205). This means that one PLC control datum after the other is executed and it is measured when the initial state and when the end state starts. Subsequently, the timely interval between the start of the initial state and the start of the end state is obtained. In step 1206 PLC machine tool sequence data are created from the measurement data. These PLC machine tool sequence data are stored in step 1207.

FIG. 13 shows an embodiment of an inventive PLC sequence simulation means. The PLC sequence simulation means 725 comprises a means for providing PLC machine tool sequence data 1301. This means for providing PLC machine tool sequence data 1301 may, for example, be an interface to the first storage means 702 in which the PLC machine tool sequence data are stored. Furthermore, the PLC sequence simulation means 725 comprises a clocking means 1302 for clocking the sequence simulation of the machine tool, the PLC sequences of the machine tool being described by the PLC machine tool sequence data, particularly as regards time.

Furthermore, the PLC sequence simulation means 725 comprises inputs 1303 for receiving PLC control output data from the PLC control means 723. Moreover, the PLC sequence simulation means 725 comprises outputs 1304 to deliver PLC control input data to the PLC control means 723. Further, the PLC sequence simulation means 725 comprises an internal sequence simulation means 1305 that generates PLC simulation data and PLC control input data depending on the input signals at the inputs 1303, the PLC machine tool sequence data as delivered by the means for providing PLC machine tool sequence data 1301, and on the clocking of the clocking means 1302. The PLC simulation data are delivered to the overall simulation means 731 by the output means 1306 and the PLC control input data are output via the outputs 1304 by means of the output means 1306.

FIG. 14 illustrates an embodiment of a user interface to an embodiment of the inventive PLC sequence simulation means. The user interface 1401 comprises an output range 1402 wherein the state of the inputs is displayed. One can image each input such that it shows whether 0 (e.g. 0 volts) or 1 (e.g. 5 volts) is applied to an input wire. The graphical icon in front of the input shows whether 0 or 1 is applied. The user interface 1401 furthermore comprises an output range 1403 wherein the state of the outputs is shown. Each of the inputs displayed there shows the state applied to an output. Moreover, the user interface 1401 comprises an output range 1404 wherein the degree of completion of the PLC sequences is displayed. For example, it can be taken from field 1405 that the step of magnetically locking the cabin door has been carried out by 100 percent.

The embodiments and drawings are merely illustrative and should not be considered limitations. It is possible to combine the features described in the embodiments in a deviating manner in order to provide further embodiments in this way which are optimized for the corresponding purpose of application. As far as such modifications are self-explanatory to a skilled person, they shall be implicitly disclosed by the above description of the embodiments.

For example many technical features that are optional have been described in FIG. 7. For example, an inventive device without a collision detection means and without a travel range checking means is conceivable. It is obvious for the skilled person that these means may be omitted in order to provide a further embodiment so that corresponding embodiments shall be considered to be implicitly disclosed even without these means.

The invention claimed is:

1. A device for simulating a sequence for machining a workpiece on a machine tool, the device comprising:
    a first storage means for storing machine tool data for creating a virtual image of a machine tool;
    a second storage means for storing workpiece data for creating a virtual image of at least one workpiece;
    a third storage means for storing operating resource data for creating a virtual image of at least one operating resource including at least one of a workpiece magazine and a tool exchanger;
    a means for providing control data for performing a sequence in conjunction with the machining of a workpiece on a machine tool, the means for providing the control data including an input means for manual input, by a user, for changing an operating state of the machine tool, the input means comprising a manual travel path input means for manually inputting, by the user, control data for manually moving a spindle, a head, and/or a table of the workpiece, the input means further including a zero-point determination input means for determining a zero-point and a clamping input means for inputting control data for clamping the workpiece;
    wherein the means for providing control data comprises a storage means for storing a CNC part program, the CNC part program being executable on a real machine tool, and the input means comprises an override means to input an override command as a ratio of a feed rate and rotary speed according to the CNC part program and a changed feed rate and a changed rotary speed, respectively, when executing the CNC part program;
    a CNC control means for creating CNC data depending on the control data;
    a PLC control means for creating PLC control output data, said PLC control means comprising a PLC program of a real PLC control executable on a machine tool;
    a PLC sequence simulation means for creating PLC simulation data and PLC control input data depending on the PLC control output data and the machine tool data;
    an overall simulation means for creating overall simulation data concerning the sequence for machining a workpiece on the machine tool depending on the CNC data, the PLC simulation data, the machine tool data, the workpiece data and the operating resource data; and
    a visualization means for visualizing the overall simulation data, the visualization means including an operation of the machine tool according to the manually inputted control data for manually moving the spindle, the head, and/or the table of the workpiece, and comprising a display means for displaying the sequence for machining a workpiece on the machine tool including at least one of the change of tools by the tool exchanger and the supply of workpieces from the workpiece magazine.

2. The device according to claim 1, wherein the CNC control means comprises a CNC program created from source code of a CNC program of a real CNC control.

3. A method for simulating a sequence for machining a workpiece on a machine tool, the method comprising the steps of:
    providing machine tool data for creating a virtual image of a machine tool;
    providing workpiece data for creating a virtual image of at least one workpiece;
    providing operating resource data for creating a virtual image of at least one operating resource including at least one of a workpiece magazine and a tool exchanger;
    providing a PLC program of a real PLC control executable on a machine tool;
    providing control data for performing a sequence in conjunction with the machining of a workpiece on a machine tool, the providing control data including a step of changing an operating state of the machine tool, by manually inputting, by the user, control data for manually moving a spindle, a head, and/or a table of the workpiece, the inputting also including inputting control data for determining a zero-point and for clamping the workpiece;
    wherein providing control data comprises storing a CNC part program, the CNC part program being executable on a real machine tool, manually putting comprises inputting an override command as a ratio of a feed rate and rotary speed according to the CNC part program and a changed feed rate and a changed rotary speed, respectively, when executing the CNC part program;
    creating CNC data depending on the control data;
    creating PLC control output data by use of the PLC program;
    creating PLC simulation data and PLC control input data depending on the PLC control output data and the machine tool data;
    creating overall simulation data concerning the sequence for machining a workpiece on the machine tool depending on the CNC data, the PLC simulation data, the machine tool data, the workpiece data and the resource data; and
    visualizing the overall simulation data, comprising the step of operating the machine tool according to the manually inputted control data for manually moving the spindle, the head, and/or the table of the workpiece, and comprising the step of displaying the sequence for machining a workpiece on the machine tool including at least one of the change or machine tools by the tool exchanger and the supply of workpieces from the workpiece magazine.

4. The method according to claim 3, further comprising a step of creating a CNC program from source code of a CNC program of a real CNC control.

5. The method according to claim 3, wherein the step of providing control data comprises the step of providing a CNC part program, wherein the CNC part program is executable on a real machine tool.

6. A non-transitory computer-readable storage medium storing a program, the program when executed by a computer, enables the computer to perform as the device in claim 1.

7. The method according to claim 4, wherein the step of providing control data comprises the step of providing a CNC part program, wherein the CNC part program is executable on a real machine tool.

8. A non-transitory computer-readable storage medium storing a program, the program when executed by a computer, enables the computer to perform as the device in claim 2.

9. A non-transitory computer-readable storage medium storing a program, the program being stored in the form of a sequence of states, the sequence of states corresponding to instructions adapted to be processed by a computer, when enabled by the program, so that a method according to claim 3 is performed.

10. A non-transitory computer-readable storage medium storing a program, the program being stored in the form of a sequence of states, the sequence of states corresponding to instructions adapted to be processed by a computer, when enabled by the program, so that a method according to claim 4 is performed.

11. A non-transitory computer-readable storage medium storing a program, the program being stored in the form of a sequence of states, the sequence of states corresponding to instructions adapted to be processed by a computer, when enabled by the program, so that a method according to claim 5 is performed.

* * * * *